US012645629B2

(12) United States Patent　　(10) Patent No.: US 12,645,629 B2
　　Akavaram et al.　　　　　　　　(45) Date of Patent: Jun. 2, 2026

(54) APPARATUS AND METHODS FOR ESTABLISHING LINK BANDWIDTHS WITHIN DIE INTERCONNECT ARCHITECTURES

(71) Applicant: QUALCOMM INCORPORATED, San Diego, CA (US)

(72) Inventors: Santhosh Reddy Akavaram, Hyderabad (IN); Sang Tran, Encinitas, CA (US); Vydhik Sharma Devaraju, Karimnagar (IN); Chintalapati Bharath Sai Varma, Hyderabad (IN); Radhakrishna Mugada, Hyderabad (IN); Pradeep Cherukoori, Wyra (IN)

(73) Assignee: Qualcomm Incorporated, San Diego, CA (US)

( * ) Notice: Subject to any disclaimer, the term of this patent is extended or adjusted under 35 U.S.C. 154(b) by 23 days.

(21) Appl. No.: 18/816,339

(22) Filed: Aug. 27, 2024

(65) Prior Publication Data

US 2026/0064615 A1　　Mar. 5, 2026

(51) Int. Cl.
　　*G06F 21/64*　　(2013.01)
　　*G06F 13/40*　　(2006.01)
(52) U.S. Cl.
　　CPC ...... *G06F 13/4027* (2013.01); *G06F 13/4068* (2013.01)
(58) Field of Classification Search
　　None
　　See application file for complete search history.

(56) References Cited

U.S. PATENT DOCUMENTS 8,126,473 B1 *　2/2012　Kim .................. H04L 12/40045
　　　　　　　　　　　　　　　　　　　　455/452.2
2007/0005248 A1 *　1/2007　Averill .................. H04L 1/0061
　　　　　　　　　　　　　　　　　　　　701/301
2007/0070885 A1 *　3/2007　Uddenberg ........... H04L 41/069
　　　　　　　　　　　　　　　　　　　　370/225

(Continued)

OTHER PUBLICATIONS

Related PCT Patent Application Ser. No. PCT/US2025/037143; Filed: Jul. 10, 2025, entitled, Apparatus and Methods for Establishing Link Bandwidths Within Die Interconnect Architectures, International Search Report Issued on Nov. 21, 2025 by the European Patent Office (EPO) acting as the ISA for WIPO (9 Pages).

*Primary Examiner* — Hyun Nam
(74) *Attorney, Agent, or Firm* — Smith, Tempel, Blaha LLC

(57)　　　　　　　ABSTRACT

Methods and apparatuses are provided that can establish data links with greater bandwidths within die-to-die interconnect architectures. In one example, a system-on-a-chip (SoC) includes an error status register, a plurality of data ports for a data link, and a processor electrically coupled to the error status register and to the plurality of data ports. The processor can receive error data from the error status register and, based on the error data, can determine a portion of the plurality of data ports that are error free. Further, the processor can determine a bandwidth for the data link based on the portion of the plurality of data ports that are error free. Further, the processor can initiate a link negotiation process to establish the link with another device based on the link width value and the portion of the plurality of data ports that are error free.

18 Claims, 8 Drawing Sheets

(56)         References Cited

U.S. PATENT DOCUMENTS

| | | | | |
|---|---|---|---|---|
| 2013/0060987 A1* | 3/2013 | Bolen | G06F 13/00 | |
| | | | | 710/316 |
| 2013/0198430 A1* | 8/2013 | Chu | G06F 1/12 | |
| | | | | 710/301 |
| 2014/0372741 A1* | 12/2014 | Gardiner | G06F 13/4045 | |
| | | | | 710/313 |
| 2015/0324268 A1 | 11/2015 | Du | | |
| 2016/0092335 A1* | 3/2016 | Boelter | G06F 13/00 | |
| | | | | 714/47.1 |
| 2016/0198478 A1* | 7/2016 | Yin | H04W 72/0453 | |
| | | | | 370/252 |
| 2017/0161222 A1* | 6/2017 | Dubal | H04L 67/10 | |
| 2017/0344414 A1* | 11/2017 | Raj | G06F 11/076 | |
| 2018/0189126 A1* | 7/2018 | Sugimoto | G06F 11/0793 | |
| 2019/0286608 A1* | 9/2019 | Arroyo | G06F 13/4027 | |
| 2022/0222198 A1 | 7/2022 | Lanka et al. | | |
| 2022/0350771 A1* | 11/2022 | Ringe | G06F 13/4068 | |
| 2022/0374319 A1 | 11/2022 | Jeon et al. | | |

* cited by examiner

APPARATUS AND METHODS FOR ESTABLISHING LINK BANDWIDTHS WITHIN DIE INTERCONNECT ARCHITECTURES

BACKGROUND

Field of the Disclosure

This disclosure relates generally to die interconnect architectures and, more particularly, to establishing link bandwidths within die interconnect architectures.

Description of Related Art

Die-to-die interconnect architectures allow dies, such as chiplets, to communicate over communication channels. These die-to-die interconnect architectures are used across a multitude of applications, such as telecommunication, automotive, cloud-based, gaming, enterprise, and networking applications, among various other applications. Die-to-die interconnect architectures may be developed according to a standard thereby allowing interoperability between dies, such dies from varying manufacturers. For example, Peripheral Component Interconnect Express (PCIe)® defines an interconnect standard that allows dies to communicate over one or more data lanes. For example, the PCIe® architecture supports a negotiation process that allows dies to determine a number of data lanes to use for a corresponding link.

Sometimes, however, a data lane experiences an error. The error may be due to thermal conditions, for instance. In response, the negotiation process may cause the dies to renegotiate and reduce the number of data lanes being used for the link. The reduced number of data lanes can decrease the link's data throughput and reliability. As such, there are opportunities to address deficiencies within die interconnect architectures, such as die architectures defined by the PCIe® standard.

SUMMARY

According to one aspect, a die comprises an error status register, a plurality of data ports that provide access to a plurality of data lanes of a data link, and a processor electrically coupled to the error status register and to the plurality of data ports. The processor is configured to receive error data from the error status register. Based on the error data, the processor is configured to determine a portion of the plurality of data lanes that are error free. The processor is also configured to determine a link width value based on the portion of the plurality of data lanes that are error free. Further, the processor is configured to transmit a link renegotiation request for the data link based on the link width value.

According to another aspect, a method by a processor includes receiving error data from an error status register. Based on the error data, the method includes determining a portion of the plurality of data lanes that are error free. The method also includes determining a link width value based on the portion of the plurality of data lanes that are error free. Further, the method includes transmitting a link renegotiation request for the data link based on the link width value.

According to another aspect, a non-transitory, machine-readable storage medium comprises instructions that, when executed by at least one processor, cause the at least one processor to perform operations. The operations include receiving error data from an error status register. Based on the error data, the operations include determining a portion of the plurality of data lanes that are error free. The operations also include determining a link width value based on the portion of the plurality of data lanes that are error free. Further, the operations include transmitting a link renegotiation request for the data link based on the link width value.

According to yet another aspect, a die comprises a physical layer comprising a plurality of data ports that provide access to a plurality of data lanes of a data link, and a data link layer electrically coupled to the physical layer. The data link layer is configured to determine a portion of the plurality of data lanes that are error free based on error data stored in an error status register. The data link layer is also configured to determine a maximum link width for the data link based on the portion of the plurality of data lanes that are error free. Further, the data link layer is configured to transmit to the physical layer a link renegotiation request identifying the maximum link width.

DETAILED DESCRIPTION

Figure 1:
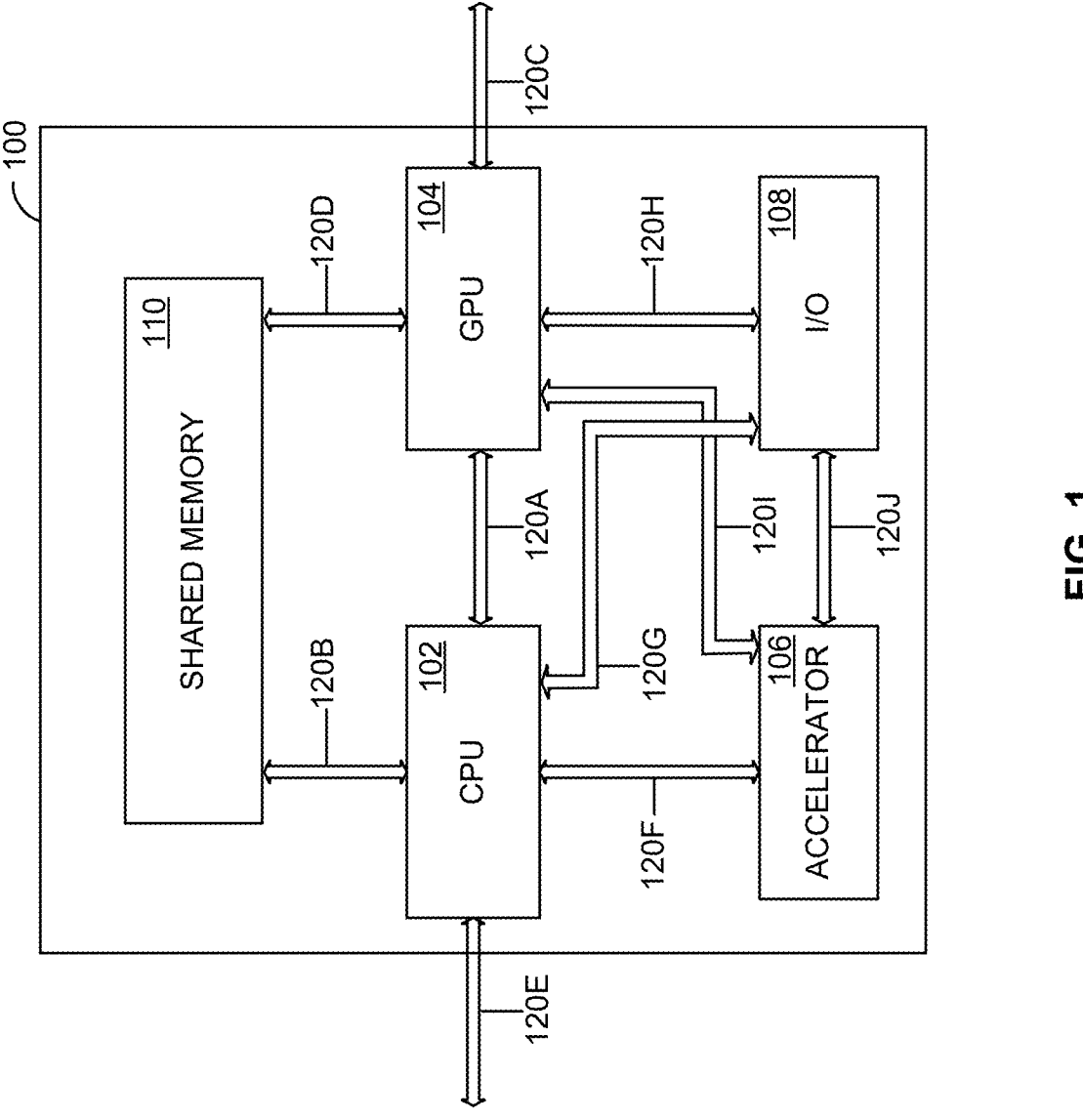
FIG. 1 is a block diagram of a die package, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to establishing data links and, more particularly, to establishing data links with greater link widths (i.e., bandwidths), within die-to-die interconnect architectures. For instance, in one example, a system-on-a-chip (SoC) includes an error status register, a plurality of data ports for a data link, and a processor electrically coupled to the error status register and to the plurality of data ports. The processor can receive error data from the error status register and, based on the error data, can determine a portion of the plurality of data ports that are error free. Further, the processor can determine a bandwidth for the data link based on the portion of the plurality of data ports that are error free. For example, the processor may determine a number of the plurality of data ports that are continuous and error free, and that allow the data link to operate at a next highest possible bandwidth. Further, the processor can initiate a link negotiation process to establish the data link with another device based on the link width value and the portion of the plurality of data ports that are error free.

Among other advantages, the embodiments may allow for greater data throughput, may allow for more efficient link width management, and may allow for a reduction in latencies associated with link negotiation processes, in die-to-die interconnect architectures.

Die-to-die interconnect architectures can allow for communications between devices, such as devices within a system-on-a-chip (SoC), or devices on corresponding SoCs that are electrically connected. For example, Peripheral Component Interconnect Express (PCIe)® defines an interconnect standard that includes a transport layer, a data link layer, and a physical layer. The data link layer provides link state management and negotiation capabilities among others, while the physical layer includes data transmit and receive signaling and clocking, as well as other capabilities. The PCIe® standard includes various states, including an "L0" state that allows devices to communicate over a data link. The data link may include one or more data lanes, such as 1, 2, 4, 8, or 16 data lanes. Each data lane may correspond to a corresponding byte of data. For instance, a data link with four data lanes may allow for the transfer of thirty-two bits of data (i.e., four data bytes) per data transfer. The PCIe® standard also supports an "L0p" state that allows some data lanes to be active (e.g., part of an active data link) while placing others in an electrical idle state (e.g., and thus not part of an active data link).

A device, such as a host device, may perform a link negotiation process with another device, such as an endpoint device, to establish a data link. Once the data link is established, each of the host device and endpoint device may enter a communication state, such as the "L0p" state, where the devices can exchange data.

In some instances, however, a data lane of the data link may experience an error. For example, the host device may detect an error with a second data lane (e.g., representing byte 1 of bytes 0-7) of an eight data line data link. The host device may read error data from an error status register to determine which data lanes of the data link are in error. For example, for the PCIe® interconnect standard, the host device may read error data from the Link Error Status Register (defined at offset 08 h per the standard). Based on the error data, the host device determines a "next highest" data link width for the data link based on the number of data lanes that are not in error and, at least in some instances, supported link widths.

For instance, and assuming that only link widths of 1, 2, 4, and 8, data lanes are supported by the data link, the host device may determine that the "next highest" data link width is four data lanes, and that the fifth, sixth, seventh, and eighth physical data lanes are to be used for the data link, as they are continuous and not in error. The host device may then initiate a data link negotiation process with the endpoint by transmitting a link renegotiation request message to the endpoint to begin establishing the data link at the lower link width. The link renegotiation request message may identify one or more of a request for link renegotiation (e.g., a bit indicating the request), the determined data link width (e.g., the four data lanes), and a starting lane address for the data link width (e.g., the fifth data lane), where the starting lane address indicates the first logical lane number for the data link. For example, the link renegotiation request message may be a type of link management (LM) data link layer packet (DLLP), as described with respect to FIGS. 3A and 3B. The endpoint may receive the link renegotiation request message, and may acknowledge the link renegotiation request message by transmitting a link renegotiation request acknowledgement message to the host device. For example, the link renegotiation request acknowledgement message may be a type of LM DLLP acknowledgement, as described with respect to FIG. 3A.

Upon receiving the acknowledgement, the host device may transmit an initial order set (e.g., TS1 order set, i.e., an order set with a TS1 identifier) on each data lane to the endpoint device. The initial order set for physical data lanes that the host device determined for use in the data link (e.g., the fifth, sixth, seventh, and eighth physical data lanes) are generated to identify their corresponding logical lane number (e.g., logical lane 0, logical lane 1, logical lane 2, and logical lane 3, respectively) and a corresponding data link number (e.g., data link 0). The link number may be the same for all of these data lanes, as they constitute the same data link. In contrast, the initial order sets for any data lanes that the host device determined are error (e.g., the second data lane), or data lanes that are not being used for the data link (e.g., the first, third, and fourth data lanes), are generated to identify that the data lanes are not being used for the data link. For example, these initial order sets may be generated to include the PAD symbol for the data lane identifier and/or the data link number. The host device may transmit the initial order sets to the endpoint device using the corresponding data lanes.

The endpoint device may receive the initial order sets (e.g., TS1 order sets) for each of the data lanes and, in response, may transmit corresponding initial response order sets to the host device. For instance, the endpoint may generate initial response order sets (e.g., TS1 order sets) for the fifth, sixth, seventh, and eighth data lanes that identify the same lane number and link number identified in the received corresponding initial order sets. Similarly, the endpoint may generate initial response order sets (e.g., TS1 order sets) for the first, second, third, and fourth data lanes to identify the PAD symbol for lane and link numbers. The endpoint may transmit these initial response order sets (e.g., TS1 order sets) to the host device.

The host device may receive the initial response order sets from the endpoint device, and may compare the link and lane numbers within the initial response order sets received for the fifth, sixth, seventh, and eighth data lanes (e.g., the data lanes to be used for the data link) with the link and lane numbers transmitted within the corresponding initial order sets for these data lanes. The host device may determine that the link and lane numbers for each of these data lanes match (e.g., are the same), and may transmit final order sets (e.g., TS2 order sets, i.e., order sets with a TS2 identifier) for each of these data lanes to the endpoint device. For example, the final order sets may identify the same lane number and link numbers matched between the transmitted and received initial order sets for each of these data lanes. In addition, the host device may continue to transmit the initial order sets for the first, second, third, and fourth data lanes that identify the PAD symbol for lane and link numbers. The host device may also place these data lanes in an electrical "idle" state (e.g., differential voltage applied to the pairs of receive and transmit signals is, or is near, 0 Volts).

The endpoint device may respond to the received final order sets by transmitting corresponding final response order sets (e.g., TS2 order sets) to the host device, and may proceed to the communication state (e.g., the "L0p" state). For example, the endpoint device may transmit final response order sets for the fifth, sixth, seventh, and eighth data lanes that identify the corresponding link and lane numbers, and may continue to transmit the initial response order sets for the first, second, third, and fourth data lanes that identify the PAD symbol for lane and link numbers. In some instances, the endpoint device stores lane mapping data characterizing the mapping of the logical data lane numbers to the physical data lanes (e.g., logical data lane 0 to the fifth physical data lane, logical data lane 1 to the sixth physical data lane, logical data lane 2 to the seventh physical data lane, and logical data lane 3 to the eighth physical data lane).

The host device may receive the final response order sets for the fifth, sixth, seventh, and eighth data lanes, and may compare the received link and lane numbers to the link and lane numbers in the corresponding transmitted final order sets. If the link and lane numbers match, the host device also proceeds to the communication state (e.g., the "L0p" state). In some instances, the host device stores lane mapping data characterizing the mapping of the logical data lane numbers to the physical data lanes (e.g., logical data lane 0 to the fifth physical data lane, logical data lane 1 to the sixth physical data lane, logical data lane 2 to the seventh physical data lane, and logical data lane 3 to the eighth physical data lane). The host device and endpoint device may then exchange data over the data link established with four data lanes.

Although described above with respect to the host device initiating the data link negotiation process, in other examples, the endpoint device may initiate the data link negotiation process. Moreover, in some examples, multiple initial order sets and/or final order sets are required to be successfully received before transitioning to the communication state. For example, the transmission and reception of initial order sets between the host device and endpoint device, as described above, may need to be repeated a predetermined number of times before final order sets are exchanged. In addition, in some instances, the transmission and reception of final order sets between the host device and endpoint device, as described above, may need to be repeated a predetermined number of times before the devices enter the communication state.

Among other advantages, the embodiments may allow for greater data throughput, may allow for more efficient link width management, and may allow for a reduction in latencies associated with link negotiation processes, in die-to-die interconnect architectures. Persons of ordinary skill in the art having the benefit of the disclosures herein may recognize these and other advantages of the embodiments as well.

FIG. 1 is a block diagram of an integrated circuit package 100 (e.g., die package) that includes various dies (e.g., chiplets), such as central processing unit (CPU) die 102, a graphical processing unit (GPU) die 104, an accelerator die 106, and input/output (I/O) die 108. In addition, integrated circuit package 100 can include memory dies (e.g., random access memory (RAM) dies, read-only memory (ROM) dies, EEPROM dies, etc.), such as shared memory 110. In some examples, shared memory 110 is a non-volatile memory device. Each of the various dies may be coupled to one or more other dies via interconnects 120. For example, CPU die 102 is coupled to GPU die via interconnect 120A, to shared memory 110 via interconnect 120B, to accelerator die 106 via interconnect 120F, and to I/O die 108 via interconnect 120G.

In addition, CPU die 102 provides an interconnect 120E that can be electrically coupled to, for example, another integrated circuit package (e.g., a system-on-a-chip (SoC)). GPU die 104 is further coupled to shared memory 110 via interconnect 120D, to accelerator 106 via interconnect 120I, and to I/O die 108 via interconnect 120H. In addition, GPU die 104 provides an interconnect 120C that can be electrically coupled to, for example, another integrated circuit package. Moreover, accelerator die 106 may be electrically coupled to I/O die 108 via interconnect 120J.

Integrated circuit package 100 is merely exemplary, and in other embodiments, an integrated circuit package may include any other suitable dies which may replace, or be added in addition to, any of the dies illustrated with respect to integrated circuit package 100. In addition, integrated circuit package 100 may be coupled to one or more other integrated circuit packages. For instance, a first integrated circuit package 100 may be coupled, over one or more interconnects 120, to a second integrated circuit package 100. These integrated circuit packages, including integrated circuit package 100, may be implemented in various types of devices, such as within networking devices, telecommunication devices, smartphone devices, gaming devices, enterprise devices, storage devices (e.g., cloud storage devices), imaging devices, and computing devices (e.g., cloud computing devices), among other types of devices.

In some examples, one or more of the interconnects 120 may be PCIe® compliant interconnects, and may allow for devices to communicate according to the PCIe® standard. For instance, the interconnect 120A may be a PCIe® compliant interconnect that allows for PCIe® compliant signaling. In this example, the CPU die 102 and GPU die 104 each include PCIe® logic, such as logic supporting the PCIe® data link layer and physical layer. The CPU die 102 may be configured as the host (e.g., "root"), and the GPU die 104 may be configured as an endpoint.

The CPU die 102 and GPU die 104 may exchange data over interconnect 120A while they are in a communication state, such as the "L0p" state of the PCIe® standard. Interconnect 120A may allow for up to a predetermined number of data lanes (e.g., one data byte per data lane), such as eight data lanes. For example, the physical layer of each device may include a corresponding data port for each data lane, and the interconnect 120A may include transmit and receive signals (e.g., differential signals) for each data port.

As described herein, one or more of the data lanes may experience an error. For example, the CPU die 102 may detect an error (e.g., data parity error) with a second data lane (e.g., representing byte 1 of bytes 0-7) of the eight data lane data link. For instance, the physical layer of the PCIe® logic of the CPU die 102 may detect a data parity error with data being received on the second data lane, and may set a corresponding bit in a corresponding lane status register (e.g., the Link Error Status Register defined at offset 08 h per the standard) indicating that the second data lane is in error. The CPU die 102 (e.g., a CPU of the die) may read the error data from the land status register and, based on the error data, determines which data lanes are not in error, and determines a "next highest" data link width for the data link based on a number of continuous data lanes that are not in error, and that do not exceed a highest supported link width value.

For instance, in this example, and assuming that only link widths of one, two, four, and eight data lanes are supported, the CPU die 102 determines that the "next highest" data link width is four data lanes to allow for four data bytes per data transfer. For instance, because the current configuration is eight data lanes, the CPU die 102 determines that the next highest link width that is supported, at least in this example, is four data lanes. The CPU die 102 then determines if there are at least four continuous data lanes that are not in error. In this example, the error data indicates that only the second data lane is in error. For instance, the error data may include one bit for each data lane. A bit that is set (e.g., set to 1 (e.g., 5V assuming active high)) indicates an error, and a bit that is not set (e.g., set to 0 (e.g., 0V assuming active high) indicates no error. In this example, the error data may be a value of 0b0000_0010 (e.g., bit 1 being set indicates that the second data lane is in error). The CPU die 102 may perform a comparison process to determine whether there are four continuous data lanes that are not in error.

For instance, the CPU die 102 may perform a 4-bit AND operation, where each combination of four consecutive bits of the error data is logically ANDed with 0xFF. If the result is 0x00, the continuous four data lanes are not in error. Otherwise, if the result is not 0x00, at least one of the data lanes is in error, and thus they are not available. The CPU die 102 may perform the above process, starting, for example, with bits 0-3 of the error data, and continue the process, shifting one bit at a time (e.g., bits 0-3, then bits 1-4, then bits 2-5, etc.) until the result indicates that four data lanes (i.e., continuous data lines) are not in error. In this example, the CPU die 102 may determine, based on the above process, that bits 0-3 have an error (e.g., due to the error indicated in bit 1) and in response, check bits 1-4 and determine that they, to, have an error (e.g., due to the error indicated in bit 1). Finally, the CPU die 102 may then check bits 2-5 and determine that there is no error, and that the third, fourth, fifth, and sixth data lanes (e.g., corresponding to data ports 2, 3, 4, and 5) are to be used for the data link. If the CPU die 102 determines that there are no four continuous data lanes that are not in error, the CPU die 102 performs the process again, but at the "next highest" data link width (e.g., in this example, 2 data lanes).

Although the above process is described with respect to determining four data lanes that are continuous and not in error, the embodiments contemplate other processes for such determinations. For instance, the CPU die 102 may use other logical operations, or may start checking for continuous data lanes not in error from the upper bits (e.g., data bits 5-8) of the error data, or may apply any other suitable processes for determining the continuous data lanes that are not in error.

The CPU die 102 may then initiate a data link negotiation process with the endpoint by transmitting a link renegotiation request message to the endpoint to begin establishing the data link at the lower link width of four data lanes. The link renegotiation request message may include a first field (e.g., a bit) indicating a request for link renegotiation (e.g., the corresponding bit set to 1), a second field for the determined data link width (e.g., four), and a third field indicating a starting lane address (i.e., starting physical lane address) for the data link (e.g., 0x0101 indicating the fifth physical data lane). Because the starting lane address indicates the fifth physical data lane, and the link width is four, a receiving endpoint determines that the physical data lanes for the requested data link include the fifth, sixth, seventh, and eighth data lanes. The GPU die 104 receives the link renegotiation request message, and transmits to the CPU die 102 a link renegotiation request acknowledgement message acknowledging the received link renegotiation request message.

The CPU die 102 device may receive the link renegotiation request acknowledgement message and, in response, may generate an initial order set (e.g., TS1 order set that includes a TS1 identifier in a corresponding field) for each data lane. The initial order set for data lanes that the CPU die 102 device determined for use in the data link, in this example the fifth, sixth, seventh, and eight data lanes, are generated to include their corresponding lane number (e.g., data lane numbers 5, 6, 7, and 8, respectively) as a data lane identifier, and a corresponding data link number (e.g., data link 0). The CPU die 102 device may also generate an initial order set for the second data lane, which the CPU die 102 determined was in error, as well as for the first, sixth, seventh, and eighth data lanes, which are not being used for the data link. The CPU die 102 may generate these initial order sets to include a predetermined value (e.g., the PAD symbol) for the data lane identifier and the data link number. The CPU die 102 may transmit the initial order sets over the corresponding data lanes to the endpoint device using the corresponding data lanes.

The GPU die 104 may receive the initial order sets (e.g., TS1 order sets) for each of the data lanes, and generates corresponding initial response order sets (e.g., TS1 order sets) for each of the data lanes. The GPU die 104 transmits the initial response order sets over the corresponding data lanes to the CPU die 102.

The CPU die 102 receives the initial response order sets from the GPU die 104, and compares the link and lane numbers within the initial response order sets for the data lanes to be used in the data link (e.g., the third, fourth, fifth, and sixth data lanes in the above example) to the link and lane numbers transmitted within the initial order sets for these data lanes. The CPU die 102 may determine that the link and lane numbers for each of these data lanes match, and may transmit final order sets (e.g., TS2 order sets that include a TS2 identifier) for each of these data lanes to the GPU die 104. The final order sets may include the same lane number and link numbers matched between the transmitted and received initial order sets for each of these data lanes. In addition, the CPU die 102 continues to transmit the initial order sets for the data lanes that are either in error, or not being used for the data link (e.g., the first, second, seventh, and eight data lanes). In some instances, the CPU die 102 performs operations (e.g., writes data to a controlling register) to place these data lanes in an electrical "idle" state (e.g., differential voltage applied to the pairs of receive and transmit signals is, or is near, 0 Volts).

The GPU die 104 may respond to the received final order sets by transmitting corresponding final response order sets (e.g., TS2 order sets) to the CPU die 102, and may proceed to a communication state, such as the "L0p" state. For example, the GPU die 104 may transmit final response order sets for the data lanes to be used for the data link (e.g., the third, fourth, fifth, and sixth data lanes in continuing the above example), where the final response order sets include the link and lane numbers received in the initial and final order sets. In addition, the GPU die 104 may also transmit the initial response order sets for the remaining data lanes (e.g., the first, second, seventh, and eight data lanes), where they each are generated to identify a predetermined value (e.g., the PAD symbol). In some examples, the GPU die 104 continues to transmit these initial response order sets occasionally (e.g., periodically).

In some instances, the GPU die 104 stores, within memory, lane mapping data characterizing the mapping of the physical data lanes to the data lane numbers (e.g., data lane 0 to the third data lane, data lane 1 to the fourth data lane, data lane 2 to the fifth data lane, and data lane 3 to the sixth data lane).

The CPU die 102 receives the final order sets for the data lanes to be used for the data link (e.g., the third, fourth, fifth, and sixth data lanes in continuing the above example), and may compare the received link and lane numbers to the link and lane numbers in the corresponding transmitted final order sets. If the link and lane numbers match, the CPU die 102 proceeds to the communication state (e.g., the "L0p"

state). In some instances, the CPU die 102 stores, within memory (e.g., shared memory 110 or an internal memory) lane mapping data characterizing the mapping of the physical data lanes to the data lane numbers (e.g., the third data lane to logical data lane 0, the fourth data lane to logical data lane 1, the fifth data lane to logical data lane 2, and the sixth data lane to logical data lane 3). The CPU die 102 and GPU die 104 may then exchange data over the interconnect 120A established with four data lanes.

Although described above with respect to establishing a data link between CPU die 102 and GPU die 104 over interconnect 120A, similar processes can be performed to establish, or re-establish, data links between other devices. For instance, CPU die 102 may establish similar data links with accelerator die 106 over interconnect 120F, or with I/O die 108 over interconnect 120G. Similarly, GPU die 104 may establish similar data links with accelerator die 106 over interconnect 120I, or with I/O die 108 over interconnect 120H. In addition, one or more of CPU die 102 and GPU die 104 may establish similar data links with shared memory 110 over interconnects 120B, 120D, respectively.

Figure 2A:
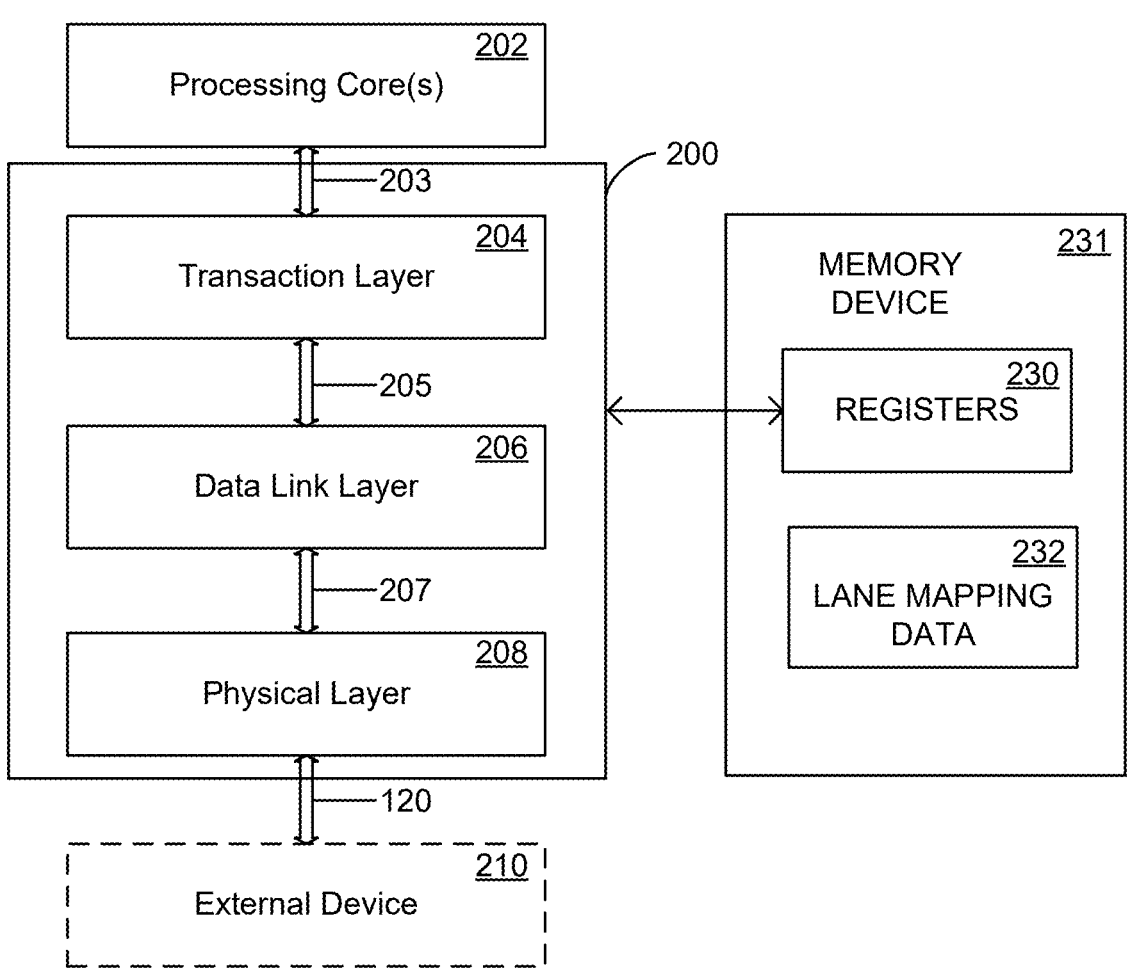
FIG. 2A is a block diagram of a layered protocol, according to some implementations.

FIG. 2A illustrates a layered protocol 200 that may be implemented by one or more of the dies of the integrated circuit package 100 of FIG. 1, such as CPU die 102 or GPU die 104. The layered protocol 200 may be one defined by a standard, such as the PCIe® standard. In this example, layered protocol 200 includes a transaction layer 204, a data link layer 206, and a physical layer 208. The data link layer 206, which may include one or more processing cores (e.g., a CPU) may perform link management and negotiation functions, among other functions as defined by the PCIe® standard. The physical layer 208 may include transmit (Tx) and receive (Rx) signals for each supported data lane and clock signals, among other signals in accordance with the PCIe® standard. As illustrated, the physical layer 208 may be electrically connected to an external device 201 (e.g., a PCIe® compliant device). The transaction layer 204 can receive data read and write requests, and can transfer data to and from the data link layer in accordance with the PCIe® standard. For instance, and as illustrated, one or more processing cores 202 executing instructions may request to the transaction layer to read from or write data to the layered protocol 200.

Figure 2B:
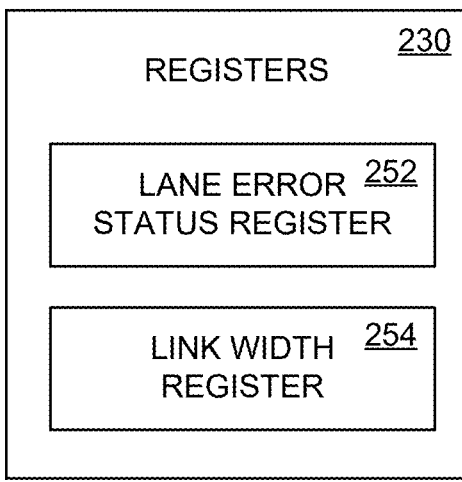
FIG. 2B is a block diagram of registers, according to some implementations.

Further, the layered protocol 200 may access registers 230, which may reside in a memory device 231 (e.g., system memory). In some examples, some or all of the registers 230 can reside in configuration space. As illustrated in FIG. 2B, the registers may include a lane error status register 252 and a link width register 254. The lane error status register 252 may identify when a data lane (e.g., associated with a corresponding data port of the physical layer 208) is in error. For instance, and as described herein, the data link layer 206 may read the lane error status register 252 to determine which of a plurality of data lanes are in error, if any. If a data lane is in error, the data link layer 206 may perform any of the renegotiation processes described herein to assign logical data lanes to physical data lanes that are not in error.

In addition, the link width register 254 may indicate which data lanes are active (e.g., in use in a data link), and which data lanes are inactive (e.g., not in use in a data link). For example, the link width register 254 may include a bit for each supported data lane (e.g., one bit for each of sixteen data lanes). On power-up (e.g., startup, or at the beginning of a configuration state), the link width register is cleared (e.g., set to all zeros). Once a link negotiation is complete, the data link layer 206 updates the link width register 254. For example, for each data lane that is being used in the negotiated data link, the data link layer 206 may set its corresponding bit (e.g., the bit is set to one). Thus, active data lanes will have their corresponding bits at one level (e.g., 1), and inactive data lanes will have their corresponding bits at a different level (e.g., 0).

Memory device 231 may also include lane mapping data 232 characterizing a mapping of physical data lanes to logical data lane numbers. For instance, the data link layer 206 may update the lane mapping data 232 when a link negotiation completes, where the lane mapping data 232 identifies which physical data lanes are active (e.g., used for data exchange), and what logical data lane number each one maps to.

Figure 3A:
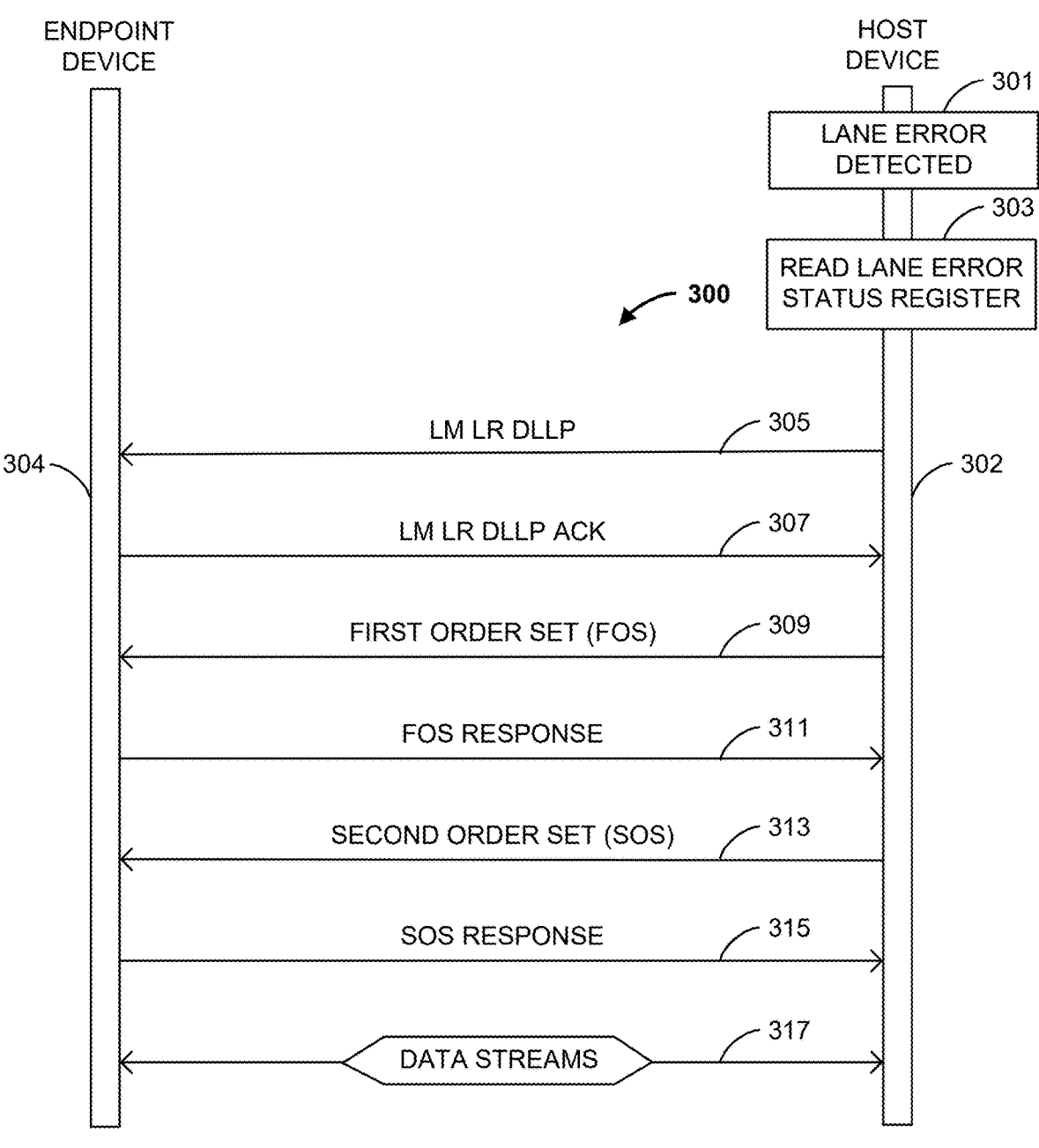
FIG. 3A illustrates messaging between devices, according to some implementations.

FIG. 3A illustrates a messaging sequence 300 between a host device 302 and an endpoint device 304. For instance, the host device 302 may be CPU die 102, and the endpoint device 304 may be PCIe® compliant device electrically connected via interconnect 120E.

As indicated in FIG. 3A, at block 301, the host device 302 may detect a lane error. For instance, due to thermal or throttling issues, a data lane of an established data link may experience a data parity error, and a corresponding bit may be set in a corresponding lane error status register (e.g., lane error status register 252). At block 303, the host device 302 reads the lane error status register, and determines that at least one data lane is in error.

Based on the error data read from the error status register, the host device 302 determines a "next highest" data link width for the data link. For example, and as described herein, if the current link width is sixteen, the host device 302 may determine that the "next highest" data link width available is eight data lanes, when the support data lane widths include lane widths of one, two, four, eight, and sixteen (i.e., eight data lanes is the next highest data link width that is supported after sixteen). In addition, the host device 302 determines eight continuous error free data lanes based on the error data, as described herein. For instance, the host device 302 may determine eight continuous bits of the error data that indicate no error. The host device 302 then generates a link management (LM) link renegotiation (LR) data link layer packet (DLLP) 305 (an example of the link renegotiation request message described herein).

Figure 3B:
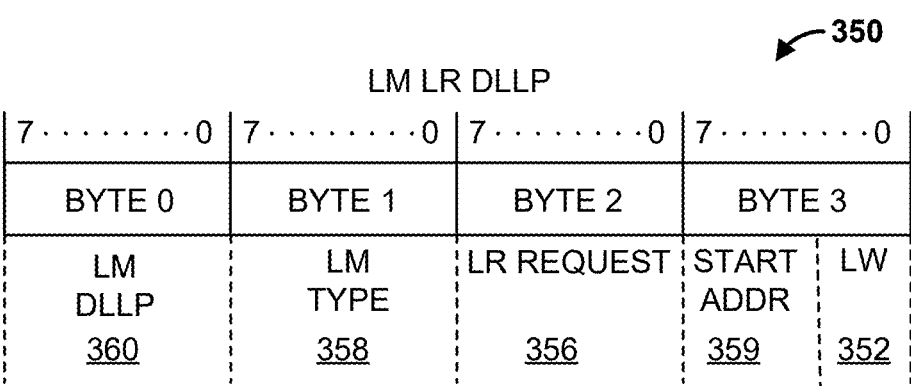
FIG. 3B illustrates a link management message, according to some implementations.
Figure 5:
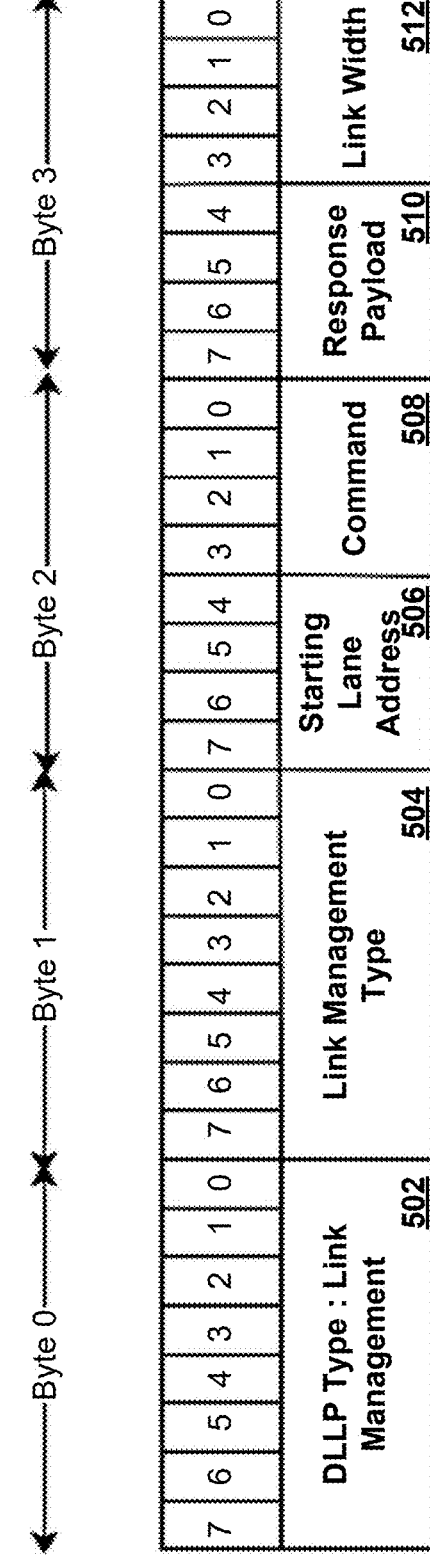
FIG. 5 illustrates another link management message, according to some implementations.

FIG. 3B illustrates LM LR DLLP 350, which may be an example of the LM LR DLLP 305. As illustrated, LM LR DLLP 350 may include a first field 356 indicating a request for link renegotiation (e.g., byte 2), a second field 352 for the determined data link width (e.g., eight), and a third field 359 indicating a starting lane address for the data link (e.g., 0x1010 indicating the tenth data lane). The LM LR DLLP 305 may also include a fourth field 360 that indicates the packet is an LM DLLP (e.g., a predetermined value), and a fifth field 358 that indicates a type of the LM DLLP. In some examples, the LM LR DLLP 305 may be a modified version of the Link Management DLLP of the PCIe® standard, where byte 1, which represents a link management type, is set to a new value, such as 0b0000_0001, indicating a link width renegotiation. FIG. 5, described further below, is another example of the LM LR DLLP 305.

Referring back to FIG. 3A, in response to receiving the LM LR DLLP 305, the endpoint device 304 generates and transmits to the host device 302 an LM LR DLLP acknowledge 307 acknowledging reception of the LM LR DLLP 305 (an example of the link renegotiation request acknowledgement message described herein). Further, and upon receiving the LM LR DLLP ACK 307, the host device 302 generates a first order set 309 for each data (e.g., each of the sixteen supported data lanes). As described herein, for data lanes that will be in use (e.g., the continuous eight data lanes), the first order set 309 identifies the corresponding lane number and link number. For data lanes that will not be in use, the host device 302 generates first order sets 309 that has a predefined value (e.g., the PAD symbol) for the lane and link numbers. The host device 302 transmits the first order sets across the various data lanes to the endpoint device 304.

The endpoint device 304 receives the various first order sets 309 and generates corresponding first order set responses 311. Each of the first order set responses 311 include the link number and lane number received in the corresponding first order set 309. The endpoint device 304 transmits the first order set responses 311 across the corresponding data lanes to the host device 302. For the data lanes that will be in use (e.g., the continuous eight data lanes), the host device 302 compares the link and lane numbers received in the first order set response 311 to the link and lane numbers transmitted in the corresponding first order set 309. If the link and lane numbers match, the host device 302 generates a second order set 313 that includes the same link and lane numbers (i.e., the link and lane numbers that matched for a given data lane). If the link and lane numbers do not match, the host device proceeds back to generating and transmitting an LM LR DLLP 305 and, in some instances, attempting to negotiate the data link width at the next highest data link width that is supported (e.g., four data lanes). For the data lanes that will not be in use, the host device generates the second order set 313 to include a predefined value (e.g., the PAD symbol) for the link and lane numbers. The host device 302 transmits the second order sets 313 to the endpoint device 304.

The endpoint device 304 receives the second order sets 313, and compares the link and lane numbers received for the data lanes that will be in use (e.g., the continuous eight data lanes) to the link and lane numbers transmitted for those lanes in the first order set responses 311. If all of the link and lane numbers match, the endpoint device 304 proceeds to generate, for each of these data lanes, a second order set response 315 that also includes the matched link and lane numbers. If, for one of these data lanes, one or more link or lane numbers do not match, the endpoint device 304 may generate the second order set response 315 to include a predefined value (e.g., the PAD symbol) in the link and lane numbers. The endpoint device 304 transmits the second order set responses 315 to the host device 302 over the corresponding data lanes. For the data lanes that will not be in use, the endpoint device 304 again transmits the first order set responses 311 with the predefined value for the link and lane number.

As described herein, in some examples, the host device 302 and endpoint device 304 may exchange first order sets 309 and corresponding first order set responses 311 until a predetermined number are successfully received without error (e.g., the host device 302 confirms that the link and lane numbers transmitted in the first order sets 309 for the data lanes that will be in use match the link and lane numbers received in the corresponding first order set responses 311). Similarly, in some examples, the host device 302 and endpoint device 304 may exchange second order sets 313 and corresponding second order set responses 315 until a predetermined number are successfully received without error. For example, the host device 302 may confirm that the link and lane numbers transmitted in the second order sets 313 for the data lanes that will be in use match the link and lane numbers received in the corresponding second order set responses 315, and the endpoint device 304 confirms that the link and lane numbers transmitted in the first order set responses 311 for the data lanes that will be in use match the link and lane numbers received in the corresponding second order sets 313. The host device 302 and endpoint device 304 may repeat this process a predetermined number of times.

Assuming all of the link and lane numbers received in the second order sets 313 for the data lanes that will be in use matched those transmitted in the first order set responses 311, the endpoint device 304 enters a communication state, such as the "L0p" state.

The host device 302 receives the second order set responses 315 for the data lanes that will be in use (e.g., the continuous eight data lanes), and compares the link and lane numbers to those transmitted in the second order sets 313. If the link and lane numbers match, the host device 302 also enters the communication state. The endpoint device 304 and host device 302 can exchange data 317 over the negotiated and established data link (e.g., the eight data lanes).

Figure 4A:
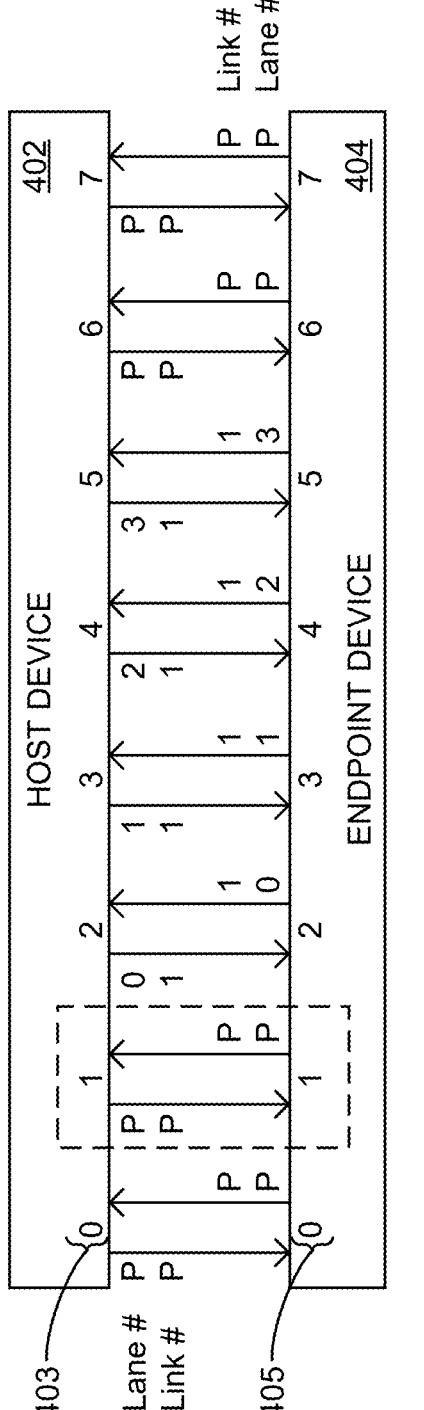
FIGS. 4A and 4B illustrate signaling between devices, according to some implementations.
Figure 4B:
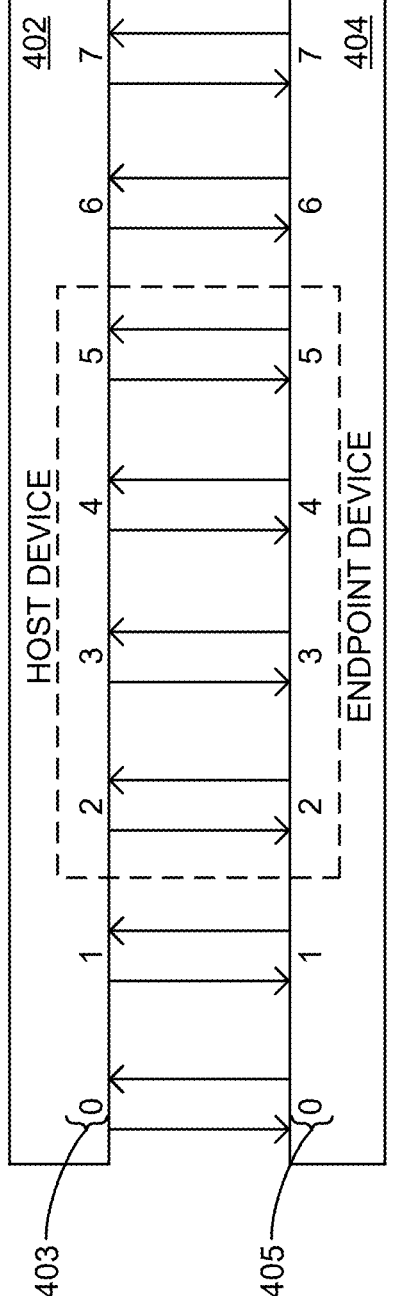

FIGS. 4A and 4B illustrate portions of a negotiation process between a host device 402 and an endpoint device 404, in accordance with some examples. With reference to FIG. 4A, the host device 402 includes various data ports 403 including data port 0, data port 1, data port 2, data port 3, data port 4, data port 5, data port 6, and data port 7. Likewise, the endpoint device 404 includes various data ports 405 including data port 0, data port 1, data port 2, data port 3, data port 4, data port 5, data port 6, and data port 7. Each of the data ports 403 of the host device 402 are electrically coupled over corresponding data lanes to corresponding data ports 405 of the endpoint device 404, where each data lane includes transmit and receive signals from the perspective of each of the host device 402 and endpoint device 404.

FIG. 4A illustrates an example of first order sets and first order set responses that may be exchanged between the host device 402 and the endpoint device 404 as part of a renegotiation process. For instance, as the host device 402 and endpoint device 404 are exchanging data using all eight data lanes for a data link (i.e., the data link width is eight), the host device 402 detects an error with the second data lane, which is coupled to data port 1. As a result, as described herein, the host device 402 may read a lane status error register (e.g., the lane error status register 252), and may transmit to the endpoint device 404 a link renegotiation request message (e.g., the LM LR DLLP 305) that identifies, in this example, a link width of four (assuming that only data lane widths of one, two, four, and eight are supported), and a starting lane address corresponding to the third data lane (i.e., associated with data port 2), thus requesting the use of the third, fourth, fifth, and sixth data lanes for the data link. The endpoint device 404 may respond to the link renegotiation request message by transmitting to the host device 402 a link renegotiation request acknowledgement message (e.g., the LM LR DLLP ACK 307).

As described herein, and based on receiving the link renegotiation request acknowledgement message, the host device 402 may generate a first order set for each of the eight data lanes. In this example, because the host device 402 determined that the third, fourth, fifth, and sixth data lanes can be used for the data link, the host device 402 generates the first order set for these lanes to identify a corresponding lane number, and a same link number for the data link. More specifically, the first order set for data port 2 (corresponding to the third data lane) identifies a logical lane number of 0, and a link number of 1. The first order set for data port 3 (corresponding to the fourth data lane) identifies a logical lane number of 1, and the same link number of 1. Further, the first order set for data port 4 (corresponding to the fifth data lane) identifies a logical lane number of 2, and the same link number of 1. In addition, the first order set for data port 5 (corresponding to the sixth data lane) identifies a logical lane number of 3, and the same link number of 1. The first order set for each of the data ports in error or not in use, including data ports 0, 1, 6, and 7 (corresponding to the first, second, seventh, and eight data lanes, respectively), identify a predefined value (i.e., a "P" symbol) for each of the link and lane numbers. Each of the first order sets may also include a unique first order set identifier (e.g., a "TS1" identifier).

As further illustrated in FIG. 4A, the endpoint device 404 may receive the first order sets for each of the data lanes, and may transmit, on each data lane, a first order set response that identifies the same link and lane numbers received in the corresponding first order set. Each of the first order set responses may also include a unique first order set identifier (e.g., the "TS1" identifier).

Further, the host device 402 may compare the link and lane numbers received in the first order set responses on the data lanes to be active in the data link (in this example, the third, fourth, fifth, and sixth data lanes corresponding to data ports 2, 3, 4, and 5, respectively) to those transmitted and, if they match, may generate second order sets that also include the same link and lane numbers. Each of the second order sets may also include a unique second order set identifier (e.g., a "TS2" identifier). The host device 402 may continue to transmit the first order set for the remaining lanes.

The endpoint device 404 may receive the second order sets for each of the data lanes, and may compare, for the data lanes to be active in the data link, the link and lane numbers received in the second order sets to the link and lane numbers transmitted in the first order set responses. If the link and lane numbers match, the endpoint device 404 transmits, on each of these data lanes, a second order set response that identifies the same link and lane numbers (i.e., the link and lane numbers received in the corresponding second order set). Each of the second order set responses may also include a unique second order set identifier (e.g., the "TS2" identifier). The endpoint device 404 may continue to transmit the first order set responses for the remaining lanes.

The endpoint device 404 may enter a communication state after transmitting the second order set responses. The host device 402 may enter the communication state after successfully receiving the second order set responses (e.g., after verifying the received link and lane numbers, as described herein). As illustrated in FIG. 4B, in the communication state, the host device 402 and endpoint device 404 may exchange data across the data link established with a link width of four, namely, the third, fourth, fifth, and sixth data lanes (corresponding to data ports 2, 3, 4, and 5, respectively), which correspond to logical lanes 0, 1, 2, and 3, respectively, of the established data link.

FIG. 5 illustrates LM LR DLLP 500, which may be another example of a link renegotiation request message. In this example, the LM LR DLLP 500 includes a DLLP type field 502, a link management type field 504, a starting lane address field 506, a command field 508, a response payload field 510, and a link width field 512. In this example, the DLLP type field 502 and link management type field 504 are illustrated as including eight bits, while the starting lane address field 506, command field 508, response payload field 510, and link width field 512 are illustrated as including four bits. In other examples, any of these fields may encompass more, or less, bits, as suitable.

The DLLP type field 502 identifies that the LM LR DLLP 500 is a LM DLLP, and may have a predefined value, such as 0b0010_1000. The link management type field 504 defines a type of LM DLLP. For instance, the link management type field 504 can be 0b0000_0000 to indicate the "L0p" state, or can be 0b0000_0001 to identify a link width renegotiation. For instance, the link management type field 504 can be set to 0b0000_0001 to indicate the LM LR DLLP 500 is a link renegotiation request message, as described herein.

Further, the starting lane address field 506 indicates the physical lane number mapped to the first logical lane, i.e., logical lane 0. For example, a value of 0b0000 indicates that the physical lane number 0 will be mapped to logical lane 0, while a value of 0b0111 indicates that the physical lane number 7 will be mapped to logical lane 0.

The command field 508 can identify any suitable command associated with a link width renegotiation (e.g., when link management type field 504 identifies a identify a link width renegotiation). For example, the command field 508 can be set to 0b0100 to indicate a link width renegotiation request (e.g., an LM LR DLLP 305), to 0b0101 to identify a link width renegotiation acknowledgement (e.g., an LM LR DLLP ACK), and 0b0111 to identify a negative link width renegotiation acknowledgement (NACK) (e.g., a rejection of the LM LR DLLP 305).

The response payload field 510 can include data for any suitable use. For instance, the response payload field 510 may include an error code associated with a negative link width renegotiation acknowledgement, or a proposed link width different from that requested. In addition, the link width field 512 can identify a link width when the link management type field 504 identifies a identify a link width renegotiation (e.g., set to 0b0100). For instance, a value of 0b0001 indicates a link width of 1, a value of 0b0010 indicates a link width of 2, a value of 0b0011 indicates a link width of 3 (e.g., if supported), a value of 0b0100 indicates a link width of 4, and so on. As an example, and assuming the starting lane address field indicates that the physical lane number 7 will be mapped to logical lane 0 and the link width field 512 identifies a link width of 2, the physical lane number 8 will be mapped to logical lane 1 to complete the two lane data link.

Figure 6:
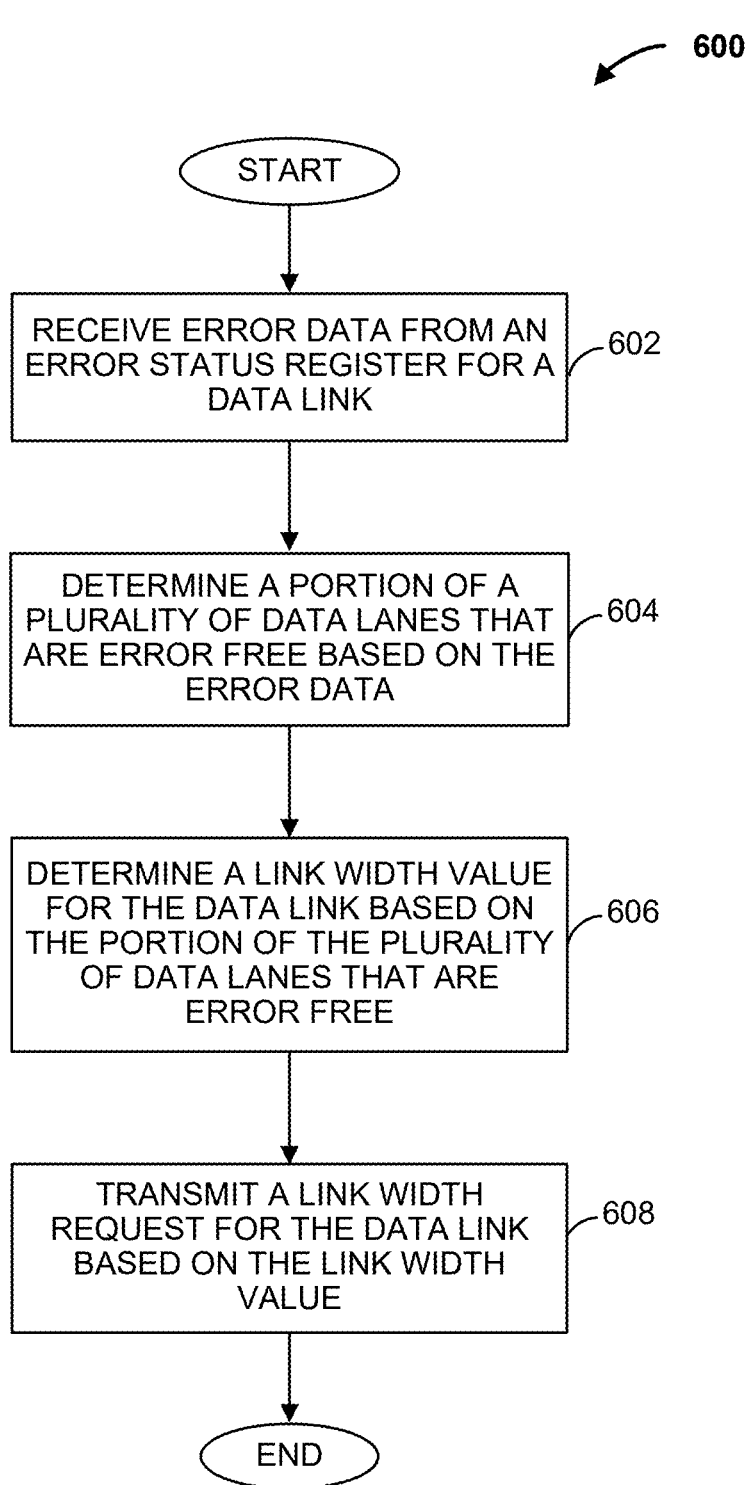
FIG. 6 is a flowchart of an exemplary process for initiating a link renegotiation process, according to some implementations.

FIG. 6 is a flowchart of an exemplary process 600 for initiating a link renegotiation process, in accordance with some embodiments. Exemplary process 600 may be carried out by a die with link renegotiation logic as described herein, such as CPU die 102 or GPU die 104.

Beginning at block 602, error data is received from an error status register that identifies errors in a data link. For example, CPU die 102 may read error data from the lane error status register 252 described herein. The error data may identify whether any of a plurality of data lanes of the data link are in error. Further, at block 604, a portion of the plurality of data lanes that are error free are determined based on the error data. For instance, the CPU die 102 may perform any of the process described herein to determine, based on the error data, that a number of continuous data lanes of the plurality of data lanes are error free.

Proceeding to block 606, a link width value is determined for the data link. The link width value is determined based on the portion of the plurality of data lanes that are error free. For example, as described herein, the CPU die 102 may determine the "next highest" data link width that is supported for the data link based on the number of data lanes that are error free.

At block 608, a link width request is transmitted for the data link based on the link width value. For example, the CPU die 102 may generate a link width request message, such as LM LR DLLP 305, LM LR DLLP 350, and LM LR DLLP 500, where the link width request message includes the link width value. As described herein, the link width request message may also include a starting lane address value indicating a mapping of the first physical data lane (e.g., physical data lane 0) to the first data lane (e.g., logical lane 0). CPU die 102 may transmit the link width request to an endpoint device, such as GPU die 104.

Figure 7:
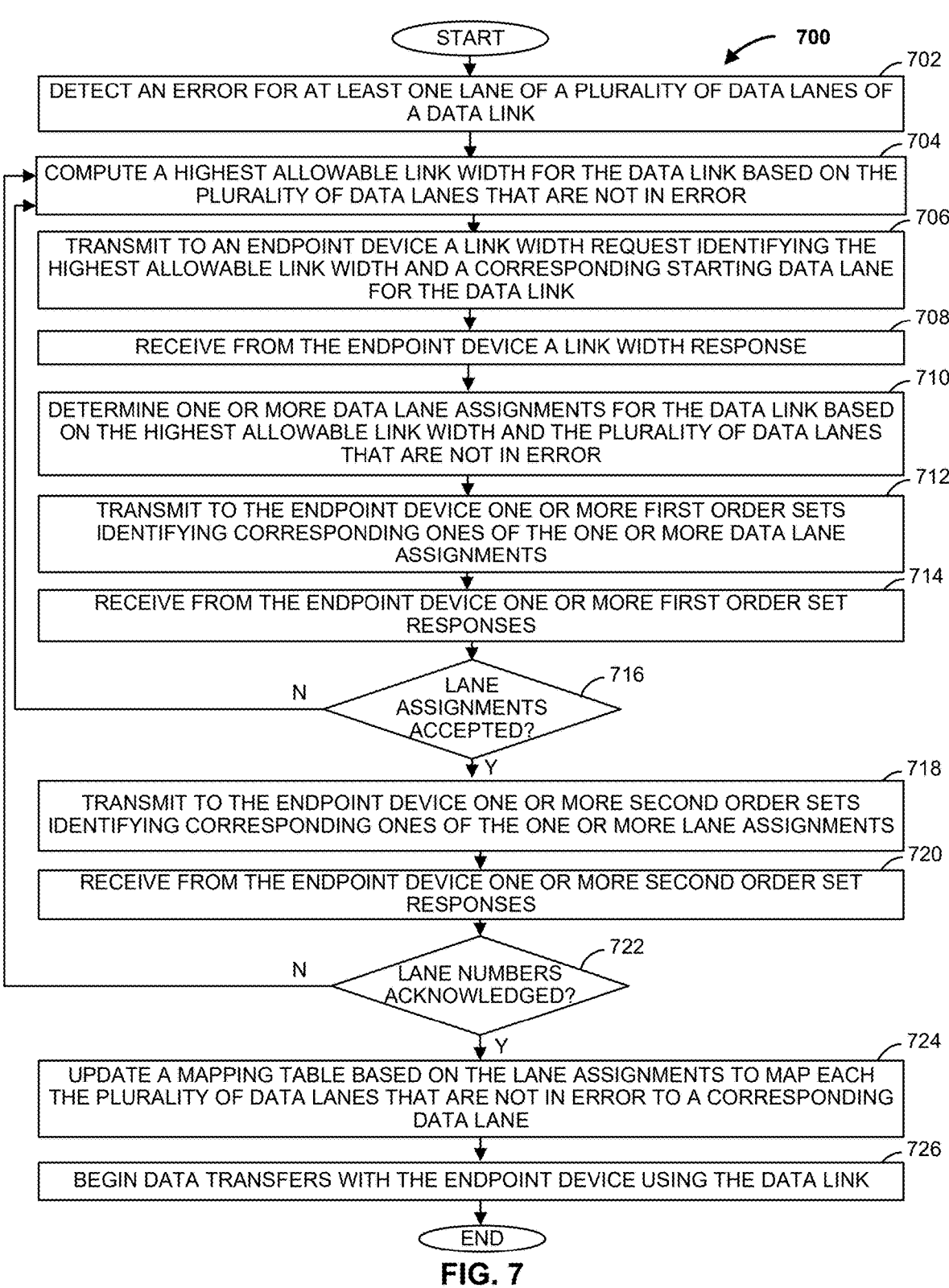
FIG. 7 is a flowchart of an exemplary process for establishing a data link, according to some implementations.

FIG. 7 is a flowchart of an exemplary process 700 for establishing a data link, in accordance with some embodiments. Exemplary process 700 may be carried out by a die with link renegotiation logic as described herein, such as CPU die 102 or GPU die 104.

Beginning at block 702, an error for at least one lane of a plurality of data lanes of a data link is detected. For example, as described herein, CPU die 102 may read error data from a lane status register (e.g., lane error status register 252), and may detect that one or more data lanes are in error based on the error data. At block 704, a highest allowable link width is computed for the data link. The highest allowable link width is computed based on the plurality of data lanes that are not in error. For example, the CPU die 102 may determine, based on the error data, that the highest allowable link width is the highest number of continuous data lanes that are not in error, and that do not exceed a highest supported link width value.

Proceeding to block 706, a link width request is transmitted to an endpoint device. The link width request identifies the highest allowable link width and a corresponding starting data lane for the data link. The link width request may, for example, the LM LR DLLP 305, LM LR DLLP 350, or LM LR DLLP 500. At block 708, a link width response is received from the endpoint device. The link width response, may be, for example, the LM LR DLLP ACK 307.

Further, at block 710, one or more data lane assignments are determined for the data link. The one or more data lane assignments are determined based on the highest allowable link width and the plurality of data lanes that are not in error. For instance, and as described herein, the CPU die 102 may assign the first of the highest number of continuous data lanes that are not in error to a first physical lane (e.g., physical lane 0). Any remaining data lanes of the continuous data lanes are then mapped consecutively to the continuous physical lanes until the highest allowable link width is satisfied (e.g., until four continuous data lanes are assigned to four physical lanes, in order, when the highest allowable link width is four).

At block 712, one or more first order sets are transmitted to the endpoint device, where each first order set identifies corresponding ones of the one or more lane assignments. For example, based on the data lane assignments, CPU die 102 may generate first order sets, such as first order sets 309, that identify a lane number, and a link number, for each of the assigned data lanes (i.e., the determined highest number of continuous data lanes). In some examples, for any other data lane, the CPU die 102 may generate a first order set that includes a predefined value, such as the PAD symbol, for the link and lane numbers. The first order sets may include a first order identifier (e.g., a "TS1" identifier).

Proceeding to block 714, one or more first order set responses are received from the endpoint device. For example, each of the first order set responses for the assigned data lane numbers may be an first order set response 311 that includes the assigned link and lane number. At block 716, a determination is made as to whether the data lane assignments were accepted. For example, CPU die 102 may compare the link and lane numbers received in the one or more first order set responses with the link and lane numbers transmitted in the corresponding first order sets, and determine, based on the comparisons, whether the data lane assignments were accepted. The CPU die 102 may determine that the data lane assignments were accepted if the link and lane numbers match for each of the data lane assignments, and may determine that the lane assignments were not accepted if at least one of the link and lane numbers for a data lane do not match. If the lane assignments were not accepted, the method proceeds back to block 706, where the next highest allowable link width is computed. Otherwise, if the lane assignments were accepted, the method proceeds to block 718.

At block 718, one or more second order sets are transmitted to the endpoint device. The second order sets identify corresponding ones of the one or more lane assignments. For instance, the CPU die 102 may generate the second order sets, such as second order sets 313, to identify, for each of the assigned data lanes, the same link and lane numbers identified in the corresponding first order sets. The second order sets may include a second order identifier (e.g., a "TS2" identifier). In some examples, the CPU die 102 transmits the same first order sets on data lanes that are not assigned (e.g., the data lane in error).

Proceeding to block 720, one or more second order set responses are received from the endpoint device. For example, each of the second order set responses for the assigned data lane numbers may be an second order set response 315 that includes the assigned link and lane number. At block 722, a determination is made as to whether the data lane assignments were acknowledged. For example, CPU die 102 may compare the link and lane numbers received in the one or more second order set responses with the link and lane numbers transmitted in the corresponding second order sets, and determine, based on the comparisons, whether the data lane assignments were successfully acknowledged. The CPU die 102 may determine that the data lane assignments were successfully acknowledged if the link and lane numbers match for each of the data lane assignments, and may determine that the lane assignments were not successfully acknowledged if at least one of the link and lane numbers for a data lane do not match. If the lane assignments were not successfully acknowledged, the method proceeds back to block 706, where the next highest allowable link width is computed. Otherwise, if the lane assignments were successfully acknowledged, the method proceeds to block 724.

At block 724, a mapping table is updated based on the lane assignments. The mapping table maps each of the plurality of data lanes that are not in error to a corresponding physical. For example, the CPU die 102 may update lane mapping data 232 to identify a mapping of the assigned data lanes (e.g., physical data lanes) to lane numbers (e.g., logical lane numbers). The method then proceeds to block 726, where data transfers with the endpoint device begin using the now established data link.

Implementation examples are further described in the following numbered clauses:

1. An die comprising:
an error status register;
a plurality of data ports of a data link; and
a processor electrically coupled to the error status register and to the plurality of data ports, wherein the processor is configured to:
receive error data from the error status register;
based on the error data, determine a portion of the plurality of data ports that are error free;
determine a link width value based on the portion of the plurality of data ports that are error free; and
transmit a link renegotiation request for the data link based on the link width value.

2. The die of clause 1, wherein the processor is configured to determine continuous data lanes of the plurality of data lanes, and determine the portion of the plurality of data lanes based on the continuous data lanes.

3. The die of any of clauses 1-2, wherein the processor is configured to determine the link width value based on one or more supported link width values.

4. The die of any of clauses 1-3, wherein the processor is configured to:
receive a link negotiation response in response to the link renegotiation request;
determine a lane number for each of the portion of the plurality of data lanes that are error free based on the link width value; and
transmit, in response to the link negotiation response, a first order set for each of the portion of the plurality of data lanes that are error free, each first order set characterizing the lane number for the corresponding data lane.

5. The die of clause 4, wherein the processor is configured to:
receive, in response to each first order set, a first order set response characterizing the lane number for the corresponding data lane;
transmit, in response to each first order set response, a second order set for each of the portion of the plurality of data lanes that are error free, each second order set characterizing the lane number for the corresponding data lane;
receive, in response to each second order set, a second order set response characterizing the lane number for the corresponding data lane; and
enable a communication state based on the second order set response received for each of the portion of the plurality of data lanes that are error free.

6. The die of clause 5, wherein the processor is configured to:
compare the lane number received in each first order set response with the lane number in the corresponding first order set;
determine, based on each comparison, that the lane numbers match; and
transmit the second order set for each of the portion of the plurality of data lanes that are error free based on the determinations.

7. The die of any of clauses 5-6, wherein the processor is configured to:
compare the lane number received in each second order set response with the lane number in the corresponding second order set;
determine, based on each comparison, that the lane numbers match; and enable the communication state based on the determinations.

8. The die of any of clauses 4-7, wherein the processor is configured to:
generate mapping data characterizing an assignment of each of the portion of the plurality of data lanes that are error free to the corresponding lane number; and
store the mapping data in a memory device.

9. The die of any of clauses 1-8, wherein the link renegotiation request includes the link width value.

10. The die of any of clauses 1-9, wherein the link renegotiation request includes a link denotation value identifying a request for link renegotiation.

11. The die of any of clauses 1-10, wherein the processor is configured to determine a starting data lane identifier of the plurality of data lanes, wherein the link renegotiation request includes the starting data lane identifier.

12. The die of any of clauses 1-11, wherein the processor is configured to receive a downlink request and, in response, read the error data from the error status register.

13. The die of any of clauses 1-12, wherein the processor is configured to determine, based on the error data, that at least one data lane of the plurality of data lanes is in an error state.

14. A method by a die comprising:
receiving error data from an error status register;
based on the error data, determining a portion of a plurality of data lanes of a data link that are error free;
determining a link width value based on the portion of the plurality of data lanes that are error free; and
transmitting a link renegotiation request for the data link based on the link width value.

15. The method of clause 14, comprising determining continuous data lanes of the plurality of data lanes, and determining the portion of the plurality of data lanes based on the continuous data lanes.

16. The method of any of clauses 14-15, comprising determining the link width value based on one or more supported link width values.

17. The method of any of clauses 14-16, comprising:
receiving a link negotiation response in response to the link renegotiation request;
determining a lane number for each of the portion of the plurality of data lanes that are error free based on the link width value; and
transmitting, in response to the link negotiation response, a first order set for each of the portion of the plurality of data lanes that are error free, each first order set characterizing the lane number for the corresponding data lane.

18. The method of clause 17, comprising:
receiving, in response to each first order set, a first order set response characterizing the lane number for the corresponding data lane;
transmitting, in response to each first order set response, a second order set for each of the portion of the plurality of data lanes that are error free, each second order set characterizing the lane number for the corresponding data lane;
receiving, in response to each second order set, a second order set response characterizing the lane number for the corresponding data lane; and
enabling a communication state based on the second order set response received for each of the portion of the plurality of data lanes that are error free.

19. The method of any of clauses 17-18, comprising:

comparing the lane number received in each first order set response with the lane number in the corresponding first order set;

determining, based on each comparison, that the lane numbers match; and transmitting the second order set for each of the portion of the plurality of data lanes that are error free based on the determinations.

20. The method of any of clauses 18-19, comprising:

comparing the lane number received in each second order set response with the lane number in the corresponding second order set;

determining, based on each comparison, that the lane numbers match; and enabling the communication state based on the determinations.

21. The method of any of clauses 17-20, comprising:

generating mapping data characterizing an assignment of each of the portion of the plurality of data lanes that are error free to the corresponding lane number; and storing the mapping data in a memory device.

22. The method of any of clauses 14-21, wherein the link renegotiation request includes the link width value.

23. The method of any of clauses 14-22, wherein the link renegotiation request includes a link denotation value identifying a request for link renegotiation.

24. The method of any of clauses 14-23, comprising determining a starting data lane identifier of the plurality of data lanes, wherein the link renegotiation request includes the starting data lane identifier.

25. The method of any of clauses 14-24, comprising receiving a downlink request and, in response, reading the error data from the error status register.

26. The method of any of clauses 14-25, comprising determining, based on the error data, that at least one data lane of the plurality of data lanes is in an error state.

27. A non-transitory, machine-readable storage medium comprising instructions that, when executed by at least one processor, cause the at least one processor to:

receive error data from an error status register;

based on the error data, determine a portion of a plurality of data lanes of a data link that are error free;

determine a link width value based on the portion of the plurality of data lanes that are error free; and transmit a link renegotiation request for the data link based on the link width value.

28. The non-transitory, machine-readable storage medium of clause 27, wherein the instructions, when executed by the at least one processor, cause the at least one processor to determine continuous data lanes of the plurality of data lanes, and determine the portion of the plurality of data lanes based on the continuous data lanes.

29. The non-transitory, machine-readable storage medium of any of clauses 27-28, wherein the instructions, when executed by the at least one processor, cause the at least one processor to determine the link width value based on one or more supported link width values.

30. The non-transitory, machine-readable storage medium of any of clauses 27-29, wherein the instructions, when executed by the at least one processor, cause the at least one processor to:

receive a link negotiation response in response to the link renegotiation request;

determine a lane number for each of the portion of the plurality of data lanes that are error free based on the link width value; and transmit, in response to the link negotiation response, a first order set for each of the portion of the plurality of data lanes that are error free, each first order set characterizing the lane number for the corresponding data lane.

31. The non-transitory, machine-readable storage medium of clause 30, wherein the instructions, when executed by the at least one processor, cause the at least one processor to:

receive, in response to each first order set, a first order set response characterizing the lane number for the corresponding data lane;

transmit, in response to each first order set response, a second order set for each of the portion of the plurality of data lanes that are error free, each second order set characterizing the lane number for the corresponding data lane;

receive, in response to each second order set, a second order set response characterizing the lane number for the corresponding data lane; and enable a communication state based on the second order set response received for each of the portion of the plurality of data lanes that are error free.

32. The non-transitory, machine-readable storage medium of clause 31, wherein the instructions, when executed by the at least one processor, cause the at least one processor to:

compare the lane number received in each first order set response with the lane number in the corresponding first order set;

determine, based on each comparison, that the lane numbers match; and transmit the second order set for each of the portion of the plurality of data lanes that are error free based on the determinations.

33. The non-transitory, machine-readable storage medium of any of clauses 31-32, wherein the instructions, when executed by the at least one processor, cause the at least one processor to:

compare the lane number received in each second order set response with the lane number in the corresponding second order set;

determine, based on each comparison, that the lane numbers match; and enable the communication state based on the determinations.

34. The non-transitory, machine-readable storage medium of any of clauses 30-33, wherein the instructions, when executed by the at least one processor, cause the at least one processor to:

generate mapping data characterizing an assignment of each of the portion of the plurality of data lanes that are error free to the corresponding lane number; and store the mapping data in a memory device.

35. The non-transitory, machine-readable storage medium of any of clauses 27-34, wherein the link renegotiation request includes the link width value.

36. The non-transitory, machine-readable storage medium of any of clauses 27-35, wherein the link renegotiation request includes a link denotation value identifying a request for link renegotiation.

37. The non-transitory, machine-readable storage medium of any of clauses 27-36, wherein the instructions, when executed by the at least one processor, cause the at least one processor to determine a starting data lane identifier of the plurality of data lanes, wherein the link renegotiation request includes the starting data lane identifier.

38. The non-transitory, machine-readable storage medium of any of clauses 27-37, wherein the instructions, when executed by the at least one processor, cause the at least one processor to receive a downlink request and, in response, read the error data from the error status register.

39. The non-transitory, machine-readable storage medium of any of clauses 27-38, wherein the instructions, when executed by the at least one processor, cause the at least one processor to determine, based on the error data, that at least one data lane of the plurality of data lanes is in an error state.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A die comprising:
an error status register;
a plurality of data ports that provide access to a plurality of data lanes of a data link; and
a processor electrically coupled to the error status register and to the plurality of data lanes, wherein the processor is configured to:
receive error data from the error status register;
based on the error data, determine a portion of the plurality of data lanes that are error free;
determine a link width value based on the portion of the plurality of data lanes that are error free;
transmit a link renegotiation request for the data link based on the link width value;
receive a link negotiation response in response to the link renegotiation request;
determine a lane number for each of the portion of the plurality of data lanes that are error free based on the link width value; and
transmit, in response to the link negotiation response, a first order set for each of the portion of the plurality of data lanes that are error free, each first order set characterizing the lane number for the corresponding data lane.

2. The die of claim 1, wherein the processor is configured to determine continuous data lanes of the plurality of data lanes, and determine the portion of the plurality of data lanes based on the continuous data lanes.

3. The die of claim 1 wherein the processor is configured to determine the link width value based on one or more supported link width values.

4. The die of claim 1, wherein the processor is configured to:
receive, in response to each first order set, a first order set response characterizing the lane number for the corresponding data lane;
transmit, in response to each first order set response, a second order set for each of the portion of the plurality of data lanes that are error free, each second order set characterizing the lane number for the corresponding data lane;
receive, in response to each second order set, a second order set response characterizing the lane number for the corresponding data lane; and
enable a communication state based on the second order set response received for each of the portion of the plurality of data lanes that are error free.

5. The die of claim 4, wherein the processor is configured to:
compare the lane number received in each first order set response with the lane number in the corresponding first order set;
determine, based on each comparison, that the lane numbers match; and
transmit the second order set for each of the portion of the plurality of data lanes that are error free based on the determinations.

6. The die of claim 4, wherein the processor is configured to:
compare the lane number received in each second order set response with the lane number in the corresponding second order set;
determine, based on each comparison, that the lane numbers match; and
enable the communication state based on the determinations.

7. The die of claim 1, wherein the processor is configured to:

generate mapping data characterizing an assignment of each of the portion of the plurality of data lanes that are error free to the corresponding lane number; and store the mapping data in a memory device.

8. The die of claim 1, wherein the link renegotiation request includes the link width value.

9. The die of claim 1, wherein the link renegotiation request includes a link value identifying a request for link renegotiation.

10. The die of claim 1, wherein the processor is configured to determine a starting data lane identifier of the plurality of data lanes, wherein the link renegotiation request includes the starting data lane identifier.

11. The die of claim 1, wherein the processor is configured to receive a request and, in response, read the error data from the error status register.

12. The die of claim 1, wherein the processor is configured to determine, based on the error data, that at least one data lane of the plurality of data lanes is in an error state.

13. A method by a die comprising:

receiving error data from an error status register;

based on the error data, determining a portion of a plurality of data lanes of a data link that are error free;

determining a link width value based on the portion of the plurality of data lanes that are error free;

transmitting a link renegotiation request for the data link based on the link width value;

receiving a link negotiation response in response to the link renegotiation request;

determining a lane number for each of the portion of the plurality of data lanes that are error free based on the link width value; and transmitting, in response to the link negotiation response, a first order set for each of the portion of the plurality of data lanes that are error free, each first order set characterizing the lane number for the corresponding data lane.

14. The method of claim 13, comprising determining continuous data lanes of the plurality of data lanes, and determining the portion of the plurality of data lanes based on the continuous data lanes.

15. The method of claim 13, comprising determining the link width value based on one or more supported link width values.

16. The method of claim 13, comprising:

receiving, in response to each first order set, a first order set response characterizing the lane number for the corresponding data lane;

transmitting, in response to each first order set response, a second order set for each of the portion of the plurality of data lanes that are error free, each second order set characterizing the lane number for the corresponding data lane;

receiving, in response to each second order set, a second order set response characterizing the lane number for the corresponding data lane; and enabling a communication state based on the second order set response received for each of the portion of the plurality of data lanes that are error free.

17. The method of claim 13, comprising:

comparing the lane number received in each first order set response with the lane number in the corresponding first order set;

determining, based on each comparison, that the lane numbers match; and transmitting the second order set for each of the portion of the plurality of data lanes that are error free based on the determinations.

18. A non-transitory, machine-readable storage medium comprising instructions that, when executed by at least one processor, cause the at least one processor to:

receive error data from an error status register;

based on the error data, determine a portion of a plurality of data lanes of a data link that are error free;

determine a link width value based on the portion of the plurality of data lanes that are error free;

transmit a link renegotiation request for the data link based on the link width value;

receive a link negotiation response in response to the link renegotiation request;

determine a lane number for each of the portion of the plurality of data lanes that are error free based on the link width value; and transmit, in response to the link negotiation response, a first order set for each of the portion of the plurality of data lanes that are error free, each first order set characterizing the lane number for the corresponding data lane.

\* \* \* \* \*